(12) United States Patent
Abbott et al.

(10) Patent No.: US 6,938,075 B1
(45) Date of Patent: Aug. 30, 2005

(54) METHOD AND APPARATUS FOR HIERARCHICAL SOFTWARE DISTRIBUTION PACKAGES INCLUDING COMPOSITE PACKAGES

(75) Inventors: Aaron Abbott, Eagan, MN (US); Brett Peterson, Eagan, MN (US); Dale Schumacher, Eagan, MN (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/220,724

(22) Filed: Dec. 24, 1998

(51) Int. Cl.[7] ............................. G06F 15/16; G06F 9/44
(52) U.S. Cl. ....................... 709/218; 717/169; 717/172
(58) Field of Search ................................. 709/217–219, 709/201, 238, 239, 200, 316; 717/100–103, 140–161, 120, 168–178; 712/28, 104, 201; 705/8, 51, 410

(56) References Cited

U.S. PATENT DOCUMENTS

| | | | | |
|---|---|---|---|---|
| 4,905,233 A | * | 2/1990 | Cain et al. | 370/237 |
| 5,095,480 A | * | 3/1992 | Fenner | 370/238 |
| 5,319,705 A | | 6/1994 | Bracco et al. | |
| 5,495,610 A | * | 2/1996 | Shing et al. | 709/221 |
| 5,581,764 A | | 12/1996 | Fitzgerald et al. | |
| 5,602,993 A | | 2/1997 | Strömberg | |
| 5,680,548 A | | 10/1997 | Trugman | |
| 5,706,431 A | * | 1/1998 | Otto | 709/221 |
| 5,937,407 A | | 8/1999 | Sakata | |
| 5,953,724 A | | 9/1999 | Lowry | |
| 6,029,004 A | | 2/2000 | Bortnikov et al. | |
| 6,108,698 A | | 8/2000 | Tenev et al. | |
| 6,134,324 A | * | 10/2000 | Bohannon et al. | 380/4 |
| 6,185,734 B1 | | 2/2001 | Saboff et al. | |
| 6,279,005 B1 | | 8/2001 | Zellweger | |
| 6,381,743 B1 | | 4/2002 | Mutschler, III | |

FOREIGN PATENT DOCUMENTS

| | | | |
|---|---|---|---|
| EP | 0 782 080 A1 | 7/1997 | |
| SE | 9601151 | 9/1997 | H04L/12/24 |

OTHER PUBLICATIONS

Amy K. Larsen, Todays's News, "Novadigm Struts Stuff in Application Distribution", Oct. 23, 1997 www.snap.de/Text/Navi/Navigator.html, Snap Navigator.
www.novell.com/press/archive/1997/04/pr97071.html, Novell Delivers New Software Distribution Tool for Intranets and Corporate Neworks.
European Search Report, Application No. EP 99 31 0254, Mar. 27, 2002, 3 pages.

* cited by examiner

*Primary Examiner*—Beatriz Prieto
(74) *Attorney, Agent, or Firm*—Fish & Richardson P.C.

(57) ABSTRACT

A software distribution system for software bundles comprising a plurality of packages, at least two of which are required by a different set of nodes on a network. Rather than send all of the packages constituting the software bundle to each node, only the packages in the software bundle which are required by nodes below a certain link in the network are sent along that link, whereby to minimize the bandwidth required for transmitting the software bundle.

9 Claims, 5 Drawing Sheets

FIG. 4B
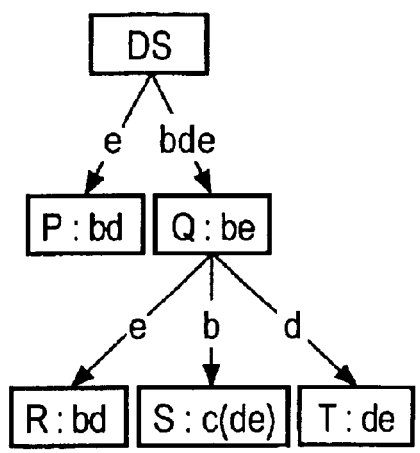
FIG. 4C
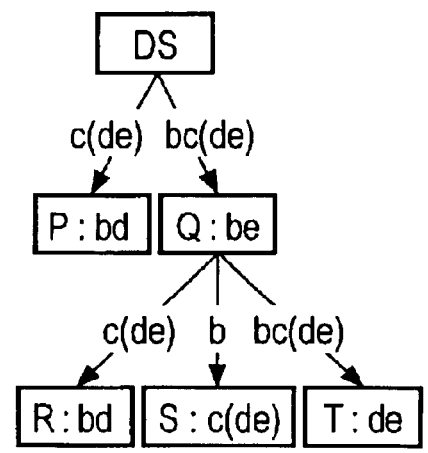
FIG. 5
|   | b | c | d | e |
|---|---|---|---|---|
| 1 | F | T | T | T |
| 2 | T | F | F | F |
| 3 | T | T | T | T |

METHOD AND APPARATUS FOR HIERARCHICAL SOFTWARE DISTRIBUTION PACKAGES INCLUDING COMPOSITE PACKAGES

BACKGROUND OF THE INVENTION

The present invention relates to software distribution and in particular to a method of software distribution across a network which minimizes the overall bandwidth used to transmit the software.

It is well known to transmit software packages across a network from a server to one or more clients which require the package. Often, newer versions of a package will be released and will need distributing to clients running the older version of the software.

The packages which are being distributed according to the invention are sets of files, optionally with accompanying scripts. The scripts are run at installation time, and might for example be pre-install scripts run before files are installed or post-install scripts run afterward.

In certain circumstances, it is not imperative that all systems running the older software be upgraded or it is not possible for a server to have a record of all the systems running the software. In these circumstances, clients running the software could periodically poll the server which might or might not have a new version of the software, and request that the software be sent to the client if the server informs the client that it has a newer version. This approach is taken by many commercial software distributors who make upgrades of their products available over the internet.

In many situations, the above solution to software distribution is not acceptable. For example, if the software in question has never been installed on a client system, the client system has no way of knowing it should request the new software. Furthermore, software upgrades often need installing immediately to maintain overall system integrity. In view of these situations, and other similar situations, it has become necessary to provide distribution software that actively distributes software packages from a server to one or more clients, rather than waiting for the clients to request the software. An example of such a system is Platinum Technology, Inc.'s AutoXfer product.

Software distribution packages are commonly hierarchical, in that files in the software distribution package can be logically grouped into smaller packages which might be required on certain clients but not on others. Such packages, containing a set of files, are referred to as simple packages, and might for example consist of the files constituting a single application. A software package might also contain one or more composite packages which do not contain actual files, but instead contain references to two or more simple or composite packages which constitute the composite package. For example, a composite package might represent a suite of applications, the simple packages for which are referenced by the composite package. In order to send a composite package between nodes in a network, the packages referred to in the composite package need to be sent, along with the composite package. In addition, a composite package may also require that its referenced packages be installed in the order specified by its definition, even if it has no contingent scripts.

During repackaging there are two kinds of composite packages to consider. An open package has no constraints upon the order or processing of its contents, but is simply an aggregation of other packages. The contents of an open package can be freely manipulated without compromising the package itself, and its presence is implied by the presence of its contents. A closed package has constraints that require that its contents be installed in the context of the package (installation) itself, and its presence must be explicitly indicated.

Often, target nodes on the network will already have one or more of the simple packages referred to in a composite package installed before the composite package is sent. If the composite package is an open package, it is highly wasteful of bandwidth to send simple packages already installed to a target node, as the simple packages are not required to complete installation of the composite package.

Standards have been implemented for software distribution formats, such as the Posix 1387.2 standard. It uses four primary objects: Fileset, Subproduct, Product, and Bundle. This standard essentially specifies installation format in a Unix environment. It calls upon other Posix standards for definitions and requirements used in the standard.

Net News uses a filtering mechanism in order to send news articles to network machines, such that only what is requested and required be sent. There is no hierarchical structure to the articles, however, so the same problems do not arise as with software distribution.

STATEMENT OF INVENTION

The present invention provides a method and apparatus for transmitting a software package made up of other smaller packages across a network in a tree distribution pattern in which the transmitting node is the root, and clients requiring some part of the package are certain nodes in the tree. According to the invention, information is provided to nodes at branches in the tree concerning which parts of the composite package are required by the clients to which that node is supplying the package. The branch node transmits only parts of the package to each of its child nodes which are required by nodes below and including that child node in the tree. Each package constituting the software package can be unpacked once any packages upon which it is contingent have been unpacked.

The invention further provides a method and apparatus for transmitting a software package made up of other smaller packages across a network by sending each of the smaller packages individually in a tree distribution pattern only to the nodes on which the smaller package in question is required, in which the transmitting node is the root, and clients requiring the smaller package are certain nodes in the tree. Each of the smaller packages constituting the software package can be unpacked once any packages upon which it is contingent have been unpacked.

In one aspect of the invention, the packages forming the software package are sent as a single entity, and repackaging is carried out at branch nodes in the tree when all nodes further down the tree along a particular branch do not require all the packages forming the package received at the branch node to be sent. A repackaged software package passed down each of the branches then contains only the packages which are required by nodes below that branch.

In another aspect of the invention, different packages forming a software package are multicasted independently to target nodes at which they are required, and then each package is unpacked once all the packages required at a target node have been received.

These and other objects of the invention will be apparent from the remaining portion of this specification.

BRIEF DESCRIPTION OF THE DRAWINGS

FIG. 4B shows a first example of the distribution of the composite package shown in FIG. 3A.

FIG. 4C shows a second example of the distribution of the composite package shown in FIG. 3A.

FIG. 5 shows an array generated by the first embodiment in establishing which packages are to be sent along each link from node Q in FIG. 4C.

DETAILED DESCRIPTION

Figure 2:
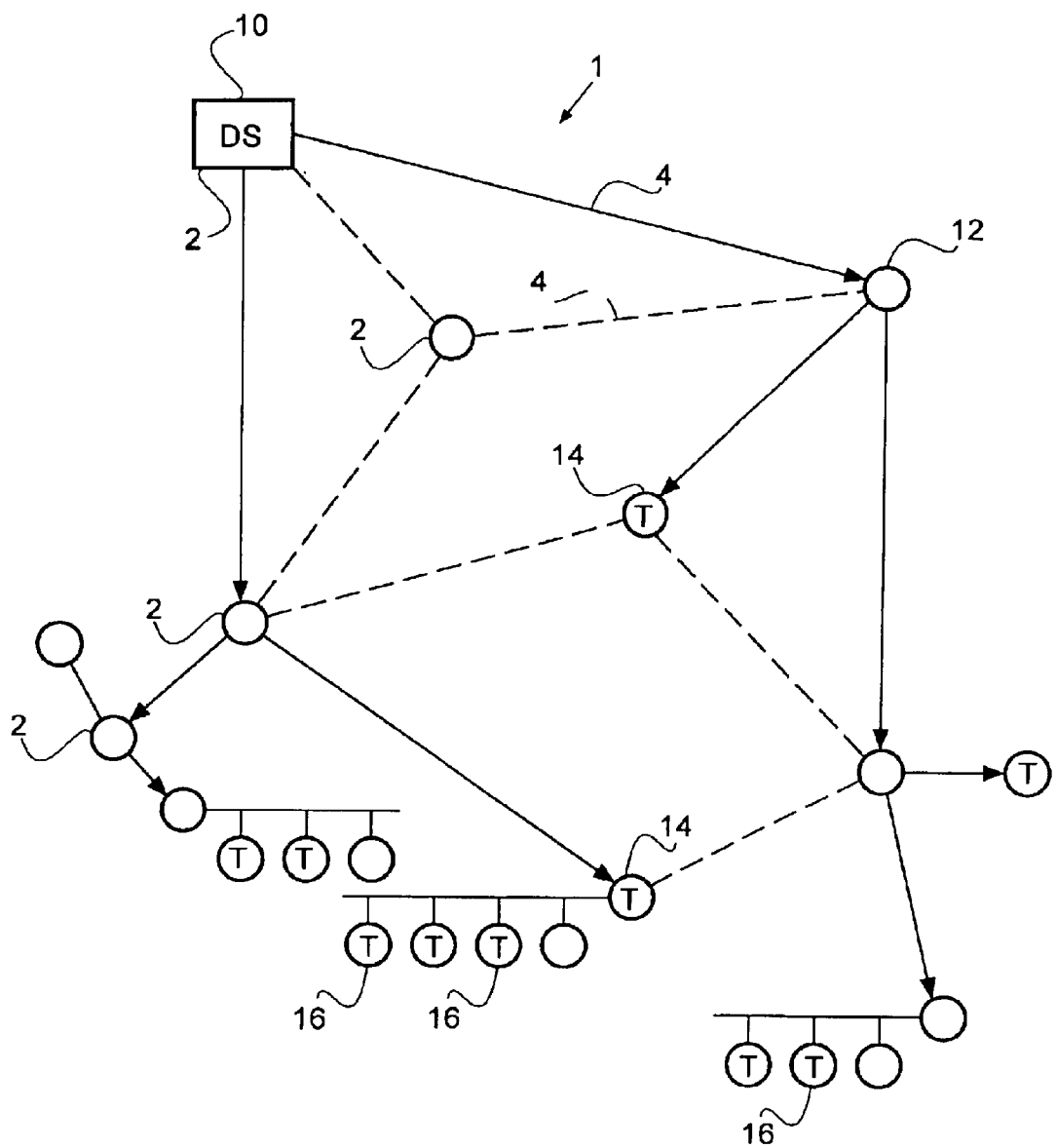
FIG. 2 shows an example of a spanning tree across the network shown in FIG. 1.
Figure 3:
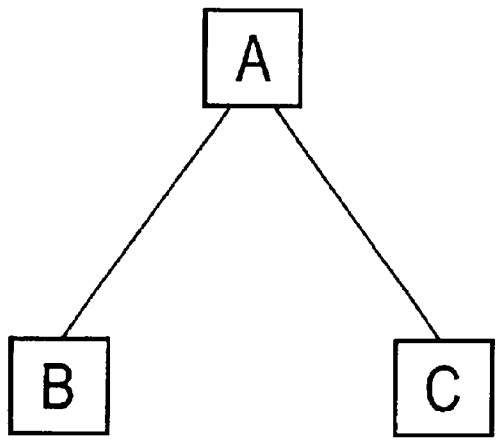
FIG. 3 shows the structure of a composite package according to a first example of the present invention.

A first embodiment of the invention will hereinafter be described with reference to FIGS. 1–3.

Figure 1:
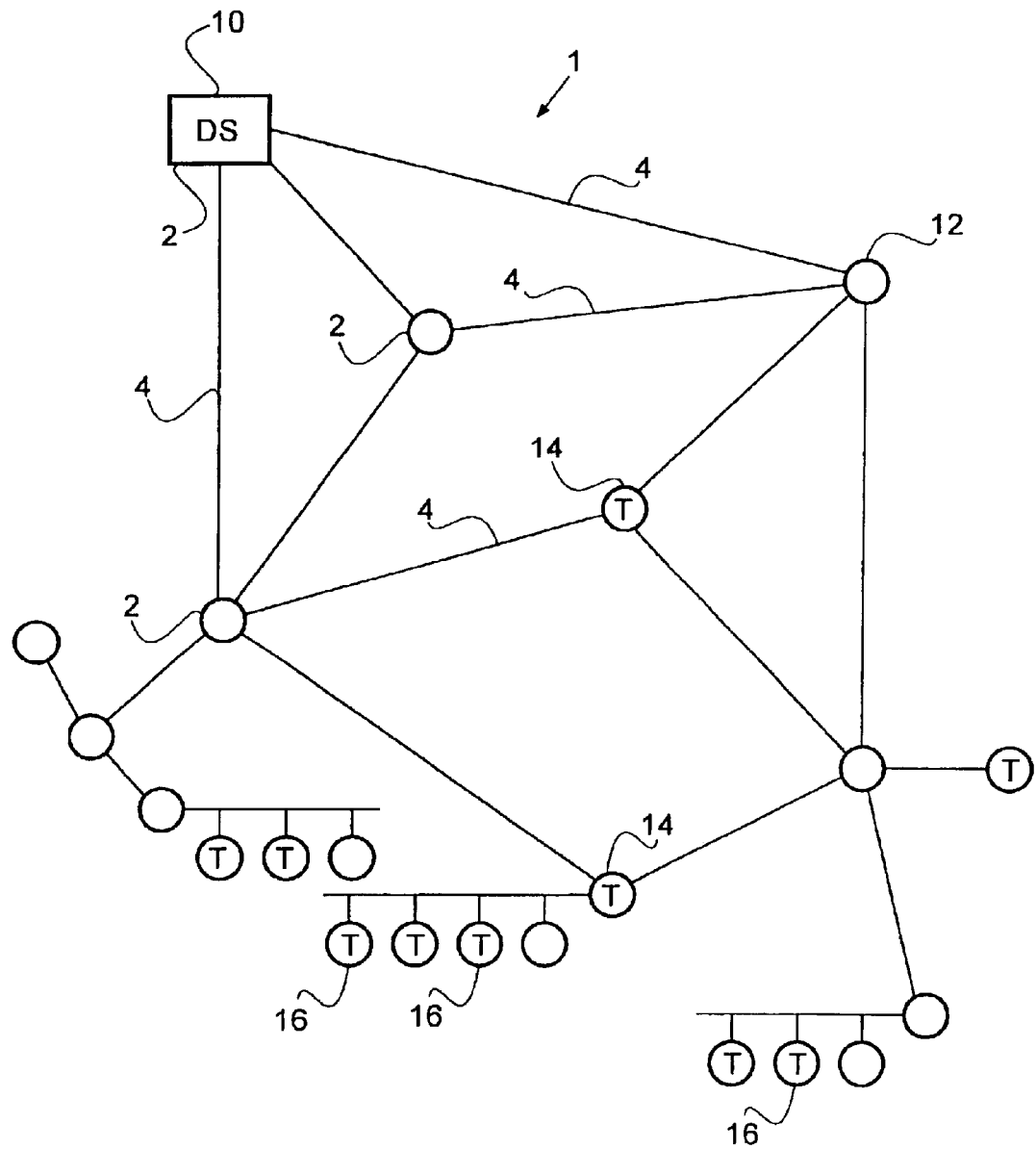
FIG. 1 shows an example of a network on which the invention might be implemented.

FIG. 1 shows an example network on which the invention could be used. Such a network has nodes 2 which can act to route data over more than one network link 4, hereinafter referred to as branch nodes. Data can be received along at least one network link, and directed to other network links from a branch node 2. In a standard configuration, data could be received from or transmitted along any of the network links 4 connected to the branch node. These branch nodes might, for example, be routers of types commonly used on packet switched networks.

A spanning tree across the network is generated from a distribution server (DS) 10 from which a software package 30 is to be distributed to a set of target nodes 14 which need to receive the software, with branching nodes 2 in the network acting as branches in the tree. Target nodes are represented with the letter "T" in FIGS. 1 and 2. Target nodes might be leaves 16 of the tree or might be branching nodes 2 in the tree. Such a spanning tree to reach the targets is shown in FIG. 2.

The tree does not need to be explicitly defined, and could, for example, be implicit in routing tables on each of the branch nodes 2 which forward data as is well known in the art. That is to say, each of the branch nodes maintains a routing table giving the shortest route currently available to a particular node. Such an architecture is well known, and there are well developed algorithms for maintaining routing tables which will provide appropriate routing to generate spanning trees from any source to any plurality of destinations. Algorithms and protocols which are used vary depending on the network architecture being used at the section of the network in question. For example, there are specific algorithms and protocols used for bridge connected LANs, one of which is described in IEEE 801.1d Such an architecture for use on Internet based systems is laid out in RFC 1716, which gives algorithms for efficiently routing Internet packages based on their IP addresses. The routing tables, or equivalent routing structures could be static, and updated manually, or dynamic based on communication between the nodes using a routing protocol such as the OSPF (Open Shortest Path First) Protocol. It should be noted that as long as the routing mechanism guarantees that the same route is always taken between any two nodes in a network, distribution from one node to a plurality of nodes will always occur in a spanning tree pattern.

Figure 4A:
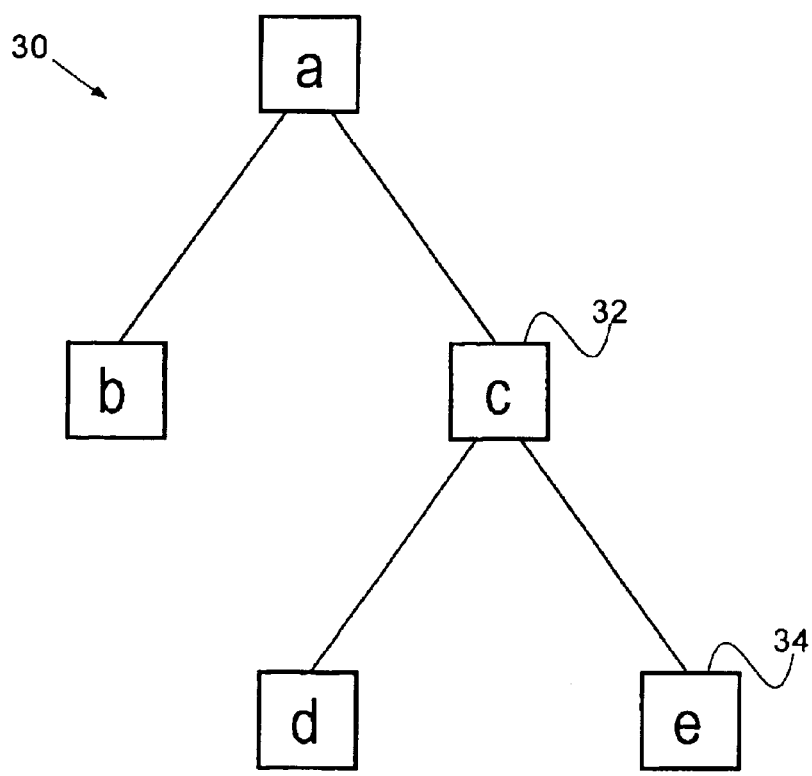
FIG. 4A shows the structure of a composite package according to an example of the present invention.

Each of the branching nodes in the tree needs to be provided with information regarding which nodes require particular simple packages 34 and composite packages 32 constituting an overall software package 30 to be sent. An example of such a software package is shown in FIG. 4A. According to this embodiment, this determination is made at the DS 10 and can be included in a transfer control file sent along with the software package 30.

According to the first embodiment, when a package is installed on a target node 14, a record of that installation is kept, so that future transfers to that target node need to include only what is required. This record might be kept at the target itself, and the target polled by the DS 10 whenever new or updated software is to be installed, or it might be maintained by the DS so that it does not have to poll all the targets. A combination of these two methods is possible.

The information required to determine which target nodes require which packages, can accordingly either be achieved by querying all the target nodes with regard to what packages are already installed thereon, or keeping track of the packages installed on each node as they are installed. If for any reason, the packages installed on a particular target node cannot be ascertained, the entire software package 30 can be sent to that target node.

Certain of the branch nodes 2 operate to repackage data in a software package 30 as will become apparent. Such branch nodes are referred to hereinafter as repackaging nodes 12. According to this embodiment, these nodes are provided with storage media capable of storing an entire software package. However, embodiments are also envisaged in which the repackaging required by this embodiment of the invention is carried out "on the fly" without requiring sufficient space to store the software package.

It is important that each of the repackaging nodes 12 is provided with all of the target nodes 14 to which it will ultimately be transmitting the data, and the packages which are required by each of these target nodes. This can easily be achieved in many ways. Two examples are as follows:

1) Data is transmitted with the software package 30 from the DS 10 including a list of all the target nodes 14 to which the package is to be transmitted. Any branch node 2 receiving the package, checks its routing table, or equivalent data store, to ascertain the shortest route to all of the nodes to which it is to transmit the package. It will send appropriate parts of the package along each of the appropriate branches to reach the targets. The branch node 2 edits the list of target nodes it forwards along each branch to include only the target nodes to be reached along the respective branch.

2) Each repackaging node 12 is provided with functionality to ascertain all targets for which it is responsible for transmitting data originating from any particular node. The list of target nodes does not need to be edited at each branch node, as long as the repackaging node knows where the packet originated. The list of target nodes could be stored in a single transfer control file as discussed above.

The following example illustrates how composite packages are sent according to the first embodiment of the present invention. As shown in FIG. 3, Composite package A consists of references to simple packages B and C. The individual installation of package B is:

1) Run B's preinstall script
2) Install B's files
3) Run B's post-install script The individual installation of package C is:

1) Run C's pre-install script
2) Install C's files
3) Run C's post-install script.

However, the installation of composite package A is:
1) Run A's pre-install script
2) Run B's pre-install script
3) Install B's files
4) Run B's post-install script
5) Run C's pre-install script
6) Install C's files
7) Run C's post-install script
8) Run A's post-install script If package B and package C have been individually installed on a target (in separate transfers) it can be inferred that package A is also installed, provided that package A is not contingent upon its scripts. When a package is contingent upon its scripts, it means that the scripts must be executed for it to be considered effectively installed.

For a given transfer, software package contents are gathered up at a DS and sent to target nodes along the hierarchy of nodes in the spanning tree. The DS sends the package to the first-level branch nodes in the tree, each of these sends it to the next level, and so on until the package has been sent to all the target nodes of the transfer. The intermediate nodes used to forward the package may also be target nodes.

Repackaging can occur whenever subsequent targets (those including and below the one being sent to) require only a portion of the contents of the package. The determination of what package contents are required at each target takes place at the DS (and is included in the transfer control file) before the transfer begins. The set of package contents required by subsequent targets defines the "new package".

In the case of an open package, referenced packages can simply be selected and sent where required. In the case of a closed package, the closed package and all packages it references, both directly and indirectly, must be sent.

In the following example, shown in FIGS. 4A, 4B and 4C, the package contains two composite packages a and c, and three simple packages b, d and e. The intent is to install package a on targets P, Q, R, S and T. Package a is an open package, and package c is considered in both the open case in FIG. 4B and the closed case shown in FIG. 4C.

Target P has packages b and d installed and requires package e.

Target Q has packages b and e installed and requires package d. Packages b and e are also sent for targets R, S and T.

Target R has packages b and d installed and requires package e.

Target S has package c[de] installed and requires package b.

Target T has packages d and e installed and requires package b.

In the case where package c is closed (FIG. 4C):

Target P has packages b and d installed and requires package c[de].

Target Q has packages b and e installed and requires package c[de]. Package b is also sent for targets S and T.

Target R has packages b and d installed and requires package c[de].

Target S has package c[de] installed and requires package b.

Target T has packages d and e installed and requires packages b and c[de].

The actual method of repackaging the packages constituting the software package 30 will vary considerably depending on the protocol and the architecture being used, but it can be seen that such repackaging would be very straightforward to implement using the knowledge from the transfer control file as to which packages are required. For example, a boolean array could be set up with a dimension corresponding to the different packages and a dimension corresponding to the different branches. All locations in this array are initially set to FALSE. A routine implemented on the repackaging node scans through the list of target nodes. When it finds a node to which it will be transmitting along a certain link, it sets the array locations in the array associated with that link in the first dimension and the packages required by that target node in the second dimension to TRUE. Once all the target nodes have been considered by the routine, the contents of the software package required along each link will be defined by the locations in the array associated with that link which are set to TRUE. FIG. 5 shows an example of an array of this type for repackaging node Q in FIG. 4C.

Figure 6A:
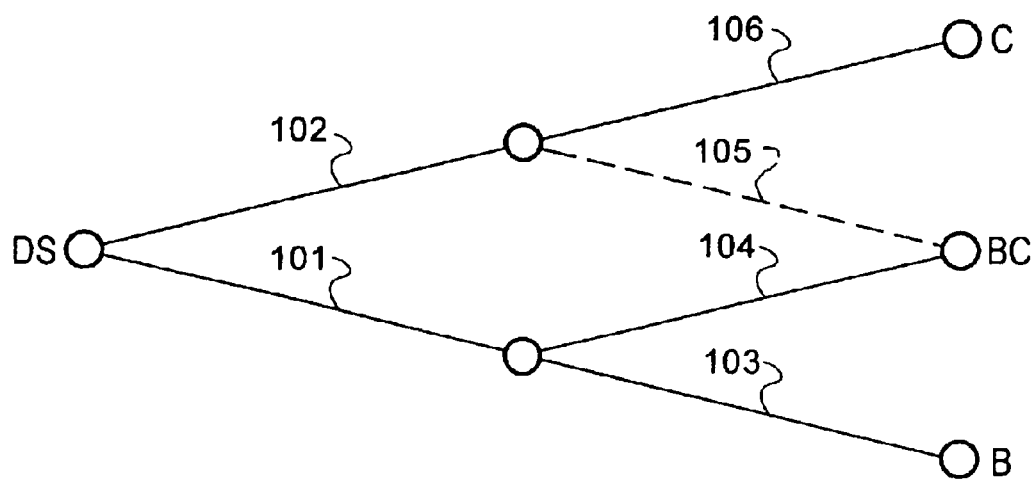
FIGS. 6A and 6B show different spanning trees as implemented in a second embodiment of the invention.
Figure 6B:
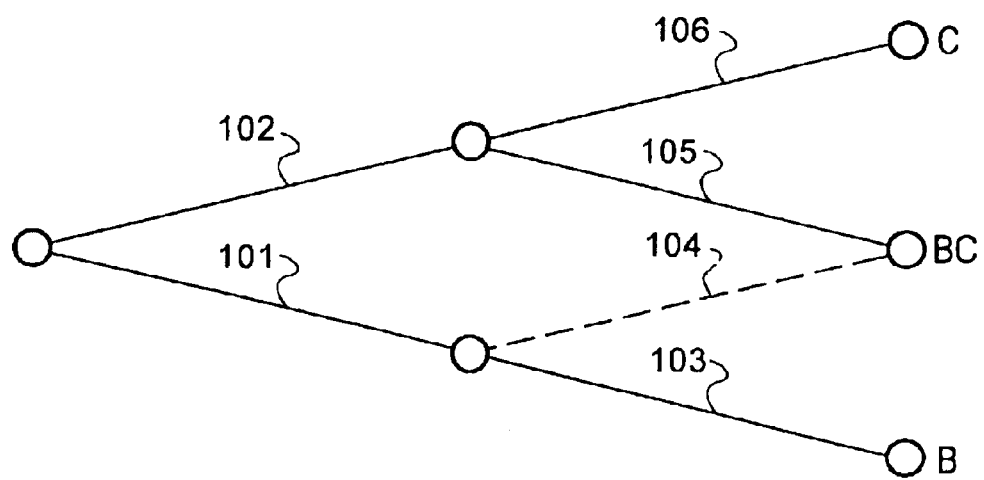

In a second embodiment of the invention, each of the simple and composite packages which comprise an overall package do not need to be transmitted as a single contiguous package, but could each be transmitted separately with its own transfer control data to ensure it is only transmitted to selected nodes. Each package constituting the overall package would effectively then be multicasted to the appropriate nodes. If a package is part of a closed composite package, the package could be provided with attachments instructing target nodes not to install the package until they receive the parent composite package. Using this alternative method, repackaging would not have to be carried out, and similar overall bandwidth would be used. Indeed, a different spanning tree could be used for each package which is being sent, depending on its target nodes. This is exemplified by FIGS. 6A and 6B. In FIG. 6A, package B is sent over a first spanning tree over links 101, 103 and 104. In FIG. 6B, package C is sent over a second spanning tree over a different three links, 102, 105 and 106. If the same spanning tree were to be used for both packages A and B, one package would have to be sent over 4 links. For example, using the tree of FIG. 6A, package C would have to be transmitted over links 101, 102, 104 and 106.

While preferred embodiments of the present invention have been illustrated and described, it will be understood by those of ordinary skill in the art that changes and modifications can be made without departure from the invention in its broader aspects. Various features of the present invention are set forth in the following claims.

What is claimed is:

1. Apparatus for hierarchical software distribution allowing distribution of a software package comprising at least a first, second, and third package to a plurality of target nodes, wherein the contents of said first, second, and third package are determined by a distribution server before the contents are distributed, said apparatus comprising:

a distribution node for transmitting packages of software;

a first branch node in communication with said distribution node, said first branch node being arranged to receive at least a portion of said software package from said distribution node;

first and second target nodes, said first target node being in communication with said first branch node via a first network link, and said second target node being in communication with said first branch node via a second network link;

said first branch node being arranged to transmit said software package over said first network link, to automatically repackage said second and third software packages into a fourth package, and to transmit the fourth package over only said second network link, and each of said first and fourth packages including a transfer control file allowing ascertainment of a shortest route to said target nodes;

such that the first, second, and third packages are distributed to both said first and second target nodes via said ascertained shortest route.

2. Apparatus according to claim 1 wherein said software package is sent as a contiguous package over said first network link.

3. Apparatus according to claim 1 wherein said first branch node is provided with information regarding which packages should be forwarded to which target nodes.

4. Apparatus according to claim 1 wherein said first branch node is in communication with said first target node via a second branch node, said second branch node being in communication with said first branch node via said first network link, and said second branch node being in communication with said first target node via a third network link; said second branch node being further in communication with a third target node via a fourth network link.

5. Apparatus according to claim 4 wherein each of said branch nodes is provided with information regarding the target nodes which require each of said first and second packages, and is further provided with information regarding which of said target nodes said branch node is responsible for forwarding information to said distribution node and which immediate branches the branch node uses to reach each of said target nodes for which it is responsible; whereby each branch node can ascertain which packages should be forwarded along each immediate branch.

6. Apparatus according to claim 1 wherein said first package comprises at least two sub-packages and wherein installation of said two sub-packages on each of said target nodes must be performed in a specified order; wherein installation of one of said sub-packages has already occurred on said first target node; and wherein both of said sub-packages are distributed to said first target node and neither of the sub-packages are sent to said second target node.

7. Apparatus for hierarchical software distribution allowing distribution of a software package comprising at least a first, second, and third package to a plurality of target nodes, said apparatus comprising:

a distribution node for transmitting packages of software;

a first branch node in communication with said distribution node, said first branch node being arranged to receive said software package from said distribution node;

first and second target nodes, said first target node being in communication with said first branch node via a first network link, and said second target node being in communication with said first branch node via a second network link; said first package already being present on said second target node;

said first branch node being arranged to transmit said software package over said first network link, to automatically repackage said second and third software packages into a fourth package, and to transmit the fourth package over only said second network link;

such that said first branch node is in communication with said first target node via a second branch node, said second branch node being; in communication with said first branch node via said first network link, and said second branch node being; in communication with said first target node via a third network link; said second branch node being further in communication with a third target node via a fourth network link;

such that each of said branch nodes is provided with information regarding target nodes to which each branch node is responsible for sending said packages and which of said first, second, and third packages are required by said nodes; and such that each branch node forwards the information to subsequent nodes along each branch, editing said information for each branch to include only target nodes reached via that branch.

8. Apparatus for hierarchical software distribution allowing distribution of a software package comprising at least a first, second, and third package to a plurality of target nodes, wherein the contents of said first, second, and third package are determined by a distribution server before the contents are distributed, said apparatus comprising:

a distribution node for transmitting packages of software;

at least one branch node in communication with said distribution node; and first and second target nodes, said first target node being in communication with said branch node via a first network link, and said second target node being in communication with said branch node via a second network link;

each branch node being arranged to receive each of said first, second, and third packages from said distribution node independently, and each of said first, second, and third packages including a transfer control file allowing ascertainment of a shortest route to said target nodes;

said branch node being arranged to transmit said software package via said first network link to said first target node via said ascertained shortest route, and to automatically repackage said second and third software packages into a fourth package and transmit the fourth package via said second network link to said second target node via said ascertained shortest route using the transfer control file associated with the second package; and said target nodes being arranged to install each package once the package is received;

such that the complete software package is installed on each of said first and second target nodes.

9. A method of distributing a software package to at least a first and second target node over at least one common network link, said software package comprising at least a first package, a second package, and a third package, wherein the contents of said second and third packages are determined by a distribution server and included in a transfer control file allowing ascertainment of a shortest route before the contents are distributed, said first software package already being present on said second node, said method comprising:

automatically repackaging said second and third packages into a fourth package; and sending said software package over said common network link; thereafter sending only said fourth package to said second target node; and sending said software package to said first target node;

such that the first, second, and third packages are distributed to both said first and second target nodes via said ascertained shortest route.

\* \* \* \* \*